United States Patent
Nichols et al.

(10) Patent No.: US 7,157,009 B2
(45) Date of Patent: Jan. 2, 2007

(54) **METHOD FOR REMOVING *CRYPTOSPORIDIUM* OOCYSTS FROM WATER**

(75) Inventors: Everett J. Nichols, Edmonds, WA (US); Jeffrey F. Williams, Langley, WA (US)

(73) Assignee: Vanson Halosource, Inc., Redmond, WA (US)

( * ) Notice: Subject to any disclaimer, the term of this patent is extended or adjusted under 35 U.S.C. 154(b) by 191 days.

(21) Appl. No.: 10/836,609

(22) Filed: Apr. 30, 2004

(65) Prior Publication Data

US 2005/0242043 A1    Nov. 3, 2005

(51) Int. Cl.
*C02F 1/54* (2006.01)
*C02F 1/76* (2006.01)
*C02F 103/42* (2006.01)

(52) U.S. Cl. .............. 210/721; 210/727; 210/730; 210/764

(58) Field of Classification Search ............... 210/730
See application file for complete search history.

(56) References Cited

U.S. PATENT DOCUMENTS

| 5,204,452 | A | | 4/1993 | Dingilian et al. |
| 5,336,415 | A | | 8/1994 | Deans |
| 5,362,717 | A | | 11/1994 | Dingilian et al. |
| 5,393,435 | A | | 2/1995 | Deans et al. |
| 5,543,056 | A | * | 8/1996 | Murcott et al. ............. 210/705 |
| 5,543,058 | A | * | 8/1996 | Miller ........................ 210/725 |
| 6,210,460 | B1 | * | 4/2001 | Zuliani et al. ................ 75/304 |
| 6,409,926 | B1 | * | 6/2002 | Martin ....................... 210/709 |
| 6,821,427 | B1 | * | 11/2004 | Macpherson et al. ....... 210/631 |
| 6,827,874 | B1 | * | 12/2004 | Souter et al. ............... 252/181 |

OTHER PUBLICATIONS

"SEA-KLEAR® 4-in-1 Clarifier," Sea-Klear, Redmond, Wash., 1-page product information.

Avery, B.K., and A. Lemley, "*Cryptosporidium*: A Waterborne Pathogen," *Water Quality Information Center, National Agricultural Library*, May 1996, <http://www.nal.usda.gov/wqic/cornell.html> [retrieved Feb. 25, 2004], 6 pages.

* cited by examiner

*Primary Examiner*—Peter A. Hruskoci
(74) *Attorney, Agent, or Firm*—Christensen O'Connor Johnson Kindness PLLC

(57) ABSTRACT

A method for stabilizing and removing *Cryptosporidium* oocysts or *Giardia* cysts from water. The method comprises adding chitosan, a salt or solution of chitosan to water containing *Cryptosporidium* oocysts or *Giardia* cysts and a halogenating agent. The method may also include adding a secondary polyelectrolyte flocculant to the water. The resulting flocs are filtered to remove the *Cryptosporidium* oocysts or *Giardia* cysts.

19 Claims, No Drawings

METHOD FOR REMOVING *CRYPTOSPORIDIUM* OOCYSTS FROM WATER

FIELD OF THE INVENTION

Pathogens, such as *Cryptosporidium* oocysts and *Giardia* cysts, are removed from water containing a halogenating agent by the addition of chitosan. The resulting flocs of *Cryptosporidium* oocysts or *Giardia* cysts and chitosan are then filtered to remove the *Cryptosporidium* oocysts or *Giardia* cysts from the water.

BACKGROUND OF THE INVENTION

*Cryptosporidium* is a water-borne parasitic protozoan responsible for the water-borne disease Cryptosporidiosis. Outbreaks of Cryptosporidiosis have been attributed to ingestion of drinking water, recreational water or food containing viable oocysts of *Cryptosporidium. Cryposporidium* oocysts are typically introduced into the water through contamination of the water with fecal matter from cattle or humans containing oocysts. The oocysts have a hard outer cell wall that renders the oocysts resistant to the effects of chlorine present at concentrations typical of drinking water and recreational water. The oocyts are approximately 4–6 microns in size, which makes them difficult to remove by filtration. Since filtration and chlorination are universally practiced as a means for clarifying and sanitizing drinking water in municipal water treatment facilities and for maintaining the clarity of recreational water such as in swimming pools, water parks, hot tubs, baths and spas, the chlorine resistance and size of the oocysts make it difficult to ensure that water is free of this disease-causing microorganism.

A variety of filters and filter medias are used to clarify water in swimming pools, water parks, hot tubs and spas. Sand filters are common for swimming pool use and municipal water treatment. Diatomaceous earth filters are also available for use in swimming pools and water parks. Cartridge filters available to both pools and spas utilize a synthetic fabric enclosed in a plastic cartridge. Different filter media exhibit different capabilities for removing particles that vary in size. Sand filters are capable of filtering out particles in the size range of 20–25 microns, while cartridge filters are typically capable of removing particles in the size range of 5–10 microns. Diatomaceous earth filters exhibit the capability of removing particles in the size range of 1–3 microns, but have to be replaced frequently.

Coagulation and flocculation followed by filtration is commonly utilized in the treatment of drinking and recreational water to remove suspended microscopic particles. Non-filterable suspended microscopic particles tend to possess an electrostatic charge that prevents the particles from aggregating into larger filterable aggregates due to charge-charge repulsion. This can be often overcome through the use of coagulants and flocculants. Coagulants are chemicals, that when dissolved in water, form ions of charge opposite to that of the suspended particles. The charge interaction of the coagulant with the particles results in the reduction of the particle's charge or so called zeta potential. Reduction of the particle's zeta potential reduces particles' charge-charge repulsion and allows the particles to come sufficiently close together to form aggregates large enough to be filtered out. The most commonly used coagulants are metal salts such as aluminum sulfate and ferric chloride and their use is highly dependent on both pH and dosage.

Flocculants are typically water soluble or water dispersible high molecular weight polyelectrolyte long chain polymers composed of repeating monomeric units that can be categorized into inorganic or organic compounds. The inorganic polyelectrolytes are polymerized metal salts and may include polyaluminum hydroxychloride, polyaluminum silicate sulfate and polyaluminum sulfate. Organic polyelectrolyte flocculants are derived synthetically or obtained from natural sources. The organic polyelectrolytes can exist as charged or uncharged polymers depending on their composition. Flocculants when added to water containing aggregates of microscopic particles or non-aggregated particles exhibit the ability to bind and gather the particles or particle aggregates into even larger aggregates that can be easily filtered. The success of this aggregation is dependent on a variety of properties unique to the particles or particle aggregates and the properties of the particular flocculant being used. The stability of the flocculated particles or aggregated particles can be important to successful removal by filtration. Unstable flocculated particles or particle aggregates may come apart during filtration and pass through the filter while only the more stable aggregates are retained. Aggregate stability can be influenced by the flow rate and pressure across the filter and the turbulence of the water.

Previous attempts at removing *Cryptosporidium* oocysts via filtration from large bodies of water moving at high flow rates have not been successful. Since *Cryptosporidium* oocysts are negatively charged, coagulants and flocculants such as ferric sulfate, ferric chloride, aluminum sulfate or polyaluminum chloride have been tried unsuccessfully as a means to remove the oocysts from water through the process of aggregation, settling and filtration. Although flocs of oocysts are formed using these particular coagulants, the *Cryptosporidium* oocyst flocs are unstable and subject to hydrodynamic shear forces that make them susceptible to breaking up and coming apart resulting in their not being retained on filters. The use of anionic or cationic polymeric polyelectrolyte flocculants has been suggested as a means to stabilize *Cryptosporidium* oocyst-containing flocs against shear. One such study involving dissolved air flotation (DAF) was performed using ferric sulfate as the primary coagulant and LT22, a cationic acrylamide co-polymer. No improvement in oocyst removal over that expected with ferric sulfate coagulant alone was observed. Sand filtration for removing *Cryptosporidium* oocysts from water has been evaluated with some success. Rapid sand filtration has been reported to remove 3 logs of *Cryptosporidium* oocysts. Slow sand filtration that utilizes a finer grain of sand and a slower flow rate was reported in a pilot scale study to be fairly good in removing *Cryptosporidium* oocysts without having to use flocculants or coagulants. The previous coagulants and flocculants cannot be used in conjunction with slow sand filtration because they tend to clog the pores and severely restrict the flow rate.

Currently there is no methodology that is effective in stabilizing flocs of *Cryptosporidium* oocysts for their significant removal from water through aggregation followed by filtration. Accordingly, there is a need to find a flocculant or coagulant or a combination of the two for obtaining significant removal of oocysts that can take advantage of existing filtration technology such as sand, diatomaceous earth or synthetic cartridge filters to provide safe water for recreation and drinking.

SUMMARY OF THE INVENTION

The present invention relates to a method of removing *Cryptosporidium* oocysts or *Giardia* cysts from water containing a halogenating agent. The method includes adding chitosan, chitosan salt, or a solution thereof to water containing *Cryptosporidium* oocysts or *Giardia* cysts and a halogenating agent. Before adding the chitosan to the water, the *Cryptosporidium* oocysts or *Giardia* cysts have been exposed to a halogenating agent for a period of time that is effective to oxidize at least a portion of the *Cryptosporidium* oocysts or *Giardia* cysts. Adding chitosan to the water containing the *Cryptosporidium* oocysts or *Giardia* cysts and a halogenating agent will result in flocs that are aggregates of *Cryptosporidium* oocysts or *Giardia* cysts and chitosan. Flocs of *Cryptosporidium* oocysts or *Giardia* cysts with chitosan are stabililized so that the *Cryptosporidium* oocysts or *Giardia* cysts can then be removed from the water by filtering the water in conventional filters.

In other embodiments, a polyelectrolyte flocculant, other than the chitosan, and a coagulant can be added to the water before, after, or during the addition of the chitosan to the water.

The method according to the invention is particularly useful in water that is presently being treated with a halogenating agent, so that the addition of chitosan is supplemental and subsequent to treatment with a halogenating agent. However, the conventional treatments utilizing halogenating agents alone are ineffective in rendering *Cryptosporidium* oocysts or *Giardia* cysts inactive. Treating water in a manner according to the invention will result in the flocculation of these pathogens into stabilized flocs that can then be removed with the use of conventional filters. Pathogen contaminated water can come from swimming pools, water parks, hot tubs, spas, and any potable or nonpotable water sources.

DETAILED DESCRIPTION OF THE PREFERRED EMBODIMENT

The term "chitosan" as used herein refers to a copolymer having greater than 65% by weight of 2-deoxy-2-aminoglucose monomeric units with the remainder of the monomeric units being 2-deoxy-2-acetamidoglucose units. Chitosan is derived from chitin by hydrolysis of some 2-deoxy-2-acetamidoglucose units to 2-deoxy-2-aminoglucose units. Due to the presence of free amino groups, chitosan is soluble in aqueous acidic solutions and is present in such media as a polycation with some of the protonated amino groups bearing a positive charge. One embodiment of a chitosan solution comprising chitosan and glacial acetic acid for use in the method according to the invention is known under the designation SEA-KLEAR, and is available from Vanson HaloSource, Inc. of Redmond Wash.

The term "halogenating agent" as used herein refers to compounds having a halogen atom bound to a strongly electronegative atom such as oxygen, nitrogen, or another halogen, and capable of donating a positively charged halogen atom. Representative halogenating agents include sodium hypochlorite, calcium hypochlorite, chlorine, hypochlorous acid, bromine, hypobromous acid, aqueous chlorine solutions, aqueous bromine solutions, N-chlorosuccinimide, sodium hypobromite, pyridinium bromide perbromide, N-bromosuccinimide, chloramine-T, chlorhexadine, biguanides, dichlorodimethylhydantoin, bromochlorodimethylhydantoin, dibromodimethylhydantoin, dichloroisocyanurate, trichloroisocyanurate, and combinations thereof. Other suitable halogenating agents will be readily apparent to those skilled in the art.

*Cryptosporidium* oocysts (*Cryptosporidium parvum*) and *Giardia* cysts (*Giardia duodenalis*) are generally not inactivated with the levels of chlorine that are typical in swimming pool, hot tub, spa, water park, potable and nonpotable water applications. Accordingly, an alternate method is removal of these pathogens that avoids resorting to such high levels of chlorine that would render the water unusable. However, even if the levels of chlorine are not sufficient to inactivate the pathogens, the levels of chlorine are sufficient to oxidize *Cryptosporidium* oocysts and *Giardia* cysts that can then be removed with chitosan through flocculation and filtration. *Cryptosporidium* oocysts and *Giardia* cysts are known to have negative charges on their surfaces. However, the typical flocculants mentioned in the background section above have not proven successful for the flocculation and removal of *Cryptosporidium* oocysts. According to the present invention, chitosan is used to bond with *Cryptosporidium* oocysts or *Giardia* cysts to produce stabilized flocs of *Cryptosporidium* oocysts or *Giardia* cysts with chitosan. Chitosan has positively charged sites that bond to the negatively charged *Cryptosporidium* oocysts or *Giardia* cysts in a manner that produces a stabilized floc that allows for the removal of *Cryptosporidium* oocysts and *Giardia* cysts through filtration.

The method according to the invention for removing *Cryptosporidium* oocysts or *Giardia* cysts from water that already contains a halogenating agent comprises adding a dose of chitosan to the water already containing the halogenating agent. The amount of halogenating agent in water is preferably in the range of about 1 ppm to about 50 ppm by weight in water. More preferably about 2 ppm or about 3 ppm to about 20 ppm by weight in water. Preferably, the chitosan is dissolved in an acidic solvent to increase the positively charged sites that can bond to *Cryptosporidium* oocysts or *Giardia* cysts. The situation of a halogenating agent already being present in water occurs in the context of swimming pools, spas, water parks, hot tubs, and any potable or nonpotable water source. Typically halogenating agents will be present in water that is treated on a routine basis for a purpose besides removing *Cryptosporidium* oocysts or *Giardia* cysts. One embodiment of the present invention is the subsequent addition of chitosan to water containing a halogenating agent after the halogenating agent has had time to oxidize the *Cryptosporidium* oocysts or *Giardia* cysts. While the exact mechanism through which chitosan and the halogenating agent interact with a *Cryptosporidium* oocyst or *Giardia* cyst is not fully understood, one embodiment of the invention provides that sites on the *Cryptosporidium* oocysts or *Giardia* cysts be oxidized by the halogenating agent before addition of the chitosan. Oxidation is increased the longer that the *Cryptosporidium* oocysts or *Giardia* cysts are exposed to the halogenating agent. While the optimum period of time that the halogenating agent should be given to oxidize sites on the *Cryptosporidium* oocysts or *Giardia* cysts is difficult to predict for any given situation, any water that has had a halogenating agent added to it before the addition of chitosan will realize some benefit of *Cryptosporidium* oocysts and *Giardia* cysts removal. As an approximation, the period of time to allow for oxidation between the *Cryptosporidium* oocysts and the halogenating agent is from several days to several hours. However, some oxidation will occur even after a short period, such as an hour or less. Even at these shorter times, chitosan will produce flocs of *Cryptospo-*

*ridium* oocysts or *Giardia* cysts that can then be removed through filtration. When chitosan, a chitosan salt or an aqueous solution of a chitosan salt is in the presence of *Cryptosporidium* oocysts or *Giardia* cysts that have been oxidized by a halogenating agent, the result will be stabilized aggregates or flocs of the *Cryptosporidium* oocysts or *Giardia* cysts with the chitosan that can then be run through filters within a matter of minutes using the existing filters already installed in the water treatment system. Such filters can include sand filters, cartridge filters and diatomaceous earth filters. The flocs of *Cryptosporidium* oocysts or *Giardia* cysts with chitosan are stable under conditions of high water flow rates or velocities that may be encountered in swimming pool, hot tub, water park, spa and potable and nonpotable water filters. "Stable" or "stabilized" floc refers to the ability of a floc to substantially remain intact to allow a majority of the floc's removal through filtration under turbulent conditions or high velocities that are encountered in swimming pool, spa, hot tub, water park, potable and nonpotable water filtration systems. Suitable levels of chitosan to cause flocculation of *Cryptosporidium* oocysts or *Giardia* cysts in water are about 5 ppb to about 100 ppm by weight.

The pH of the water is believed to have an impact on the effectiveness with which any given halogenating agent will oxidize the *Cryptosporidium* oocysts or *Giardia* cysts. For example, sodium hypochlorite exists in water as the anionic chlorite ion and the more oxidative hypochlorous acid. The relative amounts of each species depends on the pH of the water. In systems where pH can be adjusted without harmful effects, it may be beneficial to lower the pH in the case of sodium hypochlorite to produce the more oxidative hypochlorous acid.

In one embodiment of the present invention, a negatively or positively charged polyelectrolyte flocculant can be added to the water, before, after or during the addition of the chitosan. Representative polyelectrolyte flocculants, in addition to chitosan, include alginate, hexametaphosphate, carboxymethylcellulose, pectin, polyaluminum hydroxychloride, polyaluminum silicate sulfate, polyaluminum sulfate and polyacrylamide. A negatively charged anionic polyelectrolyte flocculant, for example, will combine with the cationic polyelectrolyte chitosan (bound to the *Cryptosporidium* oocysts or *Giardia* cysts) to form a polyelectrolyte complex of larger flocs containing aggregates of *Cryptosporidium* oocysts or *Giardia* cysts that are removed from the water by entrapment on a filter. This is particularly effective for filters with larger nominal pore sizes. Suitable levels of polyelectrolyte flocculants in water, not including chitosan, are about 5 ppb to about 100 ppm by weight.

In another embodiment of the present invention, a coagulant can be added to the water, before, after or during addition of the chitosan, including with or without the polyelectrolyte flocculant. Representative coagulants include inorganic aluminum or ferric salts, such as ferric or aluminum sulfate or chloride. Suitable levels of coagulant in the water are about 50 ppb to about 100 ppm by weight.

EXAMPLE 1

Demonstration of Increased Floc Size Using Both Chitosan and Alginate in Water Containing a Halogenating Agent One liter of deionized water was mixed with about 0.03–0.08 grams of dichlor (a chlorine source). A small drop (~0.02 grams) of NIVEA lotion or 2 grams of a solution consisting of 0.1 gram NIVEA lotion in 9;9 grams of distilled water was then added to the 1 liter of water containing dichlor. A cloudy solution develops upon mixing. Control water contained all ingredients except dichlor (chlorine source). SEA-KLEAR for spas (0.5% chitosan and 0.5% acetic acid in water wt./wt.) was then added dropwise (10 drops ~0.4 grams) to the test solution and allowed to mix for about 2–5 minutes. Mixing was stopped and small flocs formed within ~5 minutes in the dichlor-containing water but not the control water that did not contain dichlor. Mixing was started again and 1 drop (0.04 gram) of a 1% (wt./wt.) sodium alginate in water solution was added. Solution was mixed for about 2–5 minutes, stopped and floc size was measured. Floc size increased in comparison to the same solution without sodium alginate. Control solutions without chlorine did not form flocs.

| Dichlor Presence (chlorine source) | Chitosan (Primary Flocculant) | Alginate (Secondary Flocculant) | Floc Size (nominal) |
|---|---|---|---|
| Yes | Yes | Yes | 2,000–4,000 microns |
| Yes | Yes | No | 500 microns |
| No | Yes | Yes | none |
| No | Yes | No | none |

Results demonstrate that addition of a secondary anionic polymer flocculant to a solution containing chitosan, chlorine and NIVEA lotion can increase the size of flocculated material, which is not observed in non-chlorine containing water.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for removing *Cryptosporidium* oocysts or *Giardia* cysts from recreational water containing a halogenating agent, comprising:
    adding chitosan to the water comprising *Cryptosporidium* oocysts or *Giardia* cysts and a halogenating agent, wherein the *Cryptosporidium* oocysts or *Giardia* cysts have been exposed to the halogenating agent for a period of time effective to oxidize at least a portion of the *Cryptosporidium* oocysts or *Giardia* cysts, before adding the chitosan to the water;
    allowing the *Cryptosporidium* oocysts or *Giardia* cysts and the chitosan to form stabilized flocs in the water; and
    filtering the flocs of the *Cryptosporidium* oocysts or *Giardia* cysts and chitosan to remove the *Cryptosporidium* oocysts or *Giardia* cysts from the water.

2. The method of claim 1, wherein the chitosan is in solution.

3. The method of claim 2, wherein the solution comprises acetic acid.

4. The method of claim 1, further comprising adding an anionic or cationic polyelectrolyte flocculant to the water before, during or after adding the chitosan.

5. The method of claim 4, wherein the polyelectrolyte flocculant comprises at least one of alginate, hexametaphosphate, carboxymethylcellulose, pectin, polyaluminum hydroxychioride, polyaluminum silicate sulfate, polyaluminum sulfate or polyacrylamide.

6. The method of claim 4, wherein said polyelectrolyte flocculant is about 5 ppb to about 100 ppm by weight in water.

7. The method of claim 1, wherein the water is in a swimming pool, spa, water park, hot tub, or bath.

8. The method of claim 1, comprising filtering the floes in at least one of a sand, cartridge or diatomaceous earth filter.

9. The method of claim 1, further comprising adding an inorganic aluminum coagulant.

10. The method of claim 9, wherein said inorganic aluminum coagulant is aluminum sulfate or polyaluminum chloride.

11. The method of claim 9, wherein the inorganic aluminum coagulant is about 50 ppb to about 100 ppm by weight in water.

12. The method of claim 1, further comprising adding a ferric salt coagulant.

13. The method of claim 12, wherein said ferric salt coagulant is ferric sulfate or ferric chloride.

14. The method of claim 12, wherein said ferric salt coagulant is about 50 ppb to about 100 ppm by weight in water.

15. The method of claim 1, wherein said chitosan is about 5 ppb to about 100 ppm by weight in water.

16. The method of claim 1, wherein the halogenating agent comprises at least one of sodium hypochlorite, calcium hypochlorite, chlorine, hypochlorous acid, bromine, hypobromous acid, N-chlorosuccinimide, sodium hypobromite, pyridinium bromide perbromide, N-bromosuccinimide, chloramine-T, chlorhexadine, biguanides, dichlorodimethylhydantoin, bromochlorodimethylhydantoin dibromodimethylhydantoin, dichloroisocyanurate, or trichloroisocyanurate.

17. The method of claim 1, wherein said halogenating agent is about 1 ppm to about 50 ppm by weight in water.

18. The method of claim 1, wherein said halogenating agent is about 2 ppm to about 20 ppm by weight in water.

19. The method of claim 1, comprising adding a halogenating agent to the water before adding chitosan.

* * * * *

UNITED STATES PATENT AND TRADEMARK OFFICE
CERTIFICATE OF CORRECTION

PATENT NO. : 7,157,009 B2  Page 1 of 1
APPLICATION NO. : 10/836609
DATED : January 2, 2007
INVENTOR(S) : E.J. Nichols et al.

It is certified that error appears in the above-identified patent and that said Letters Patent is hereby corrected as shown below:

| COLUMN | LINE | |
|---|---|---|
| 6 (Claim 5, | 66 line 4) | "hydroxychioride" should read --hydroxychloride-- |
| 7 (Claim 8, | 6 line 1) | "floes" should read --flocs-- |
| 8 (Claim 16, | 9 line 7) | after "bromochlorodimethylhydantoin" insert --,-- |

Signed and Sealed this

Seventh Day of August, 2007

JON W. DUDAS
*Director of the United States Patent and Trademark Office*